(12) United States Patent
Sale et al.

(10) Patent No.: US 11,897,031 B2
(45) Date of Patent: Feb. 13, 2024

(54) METHOD FOR PRODUCING HOLLOW, LARGE DIMENSIONAL TURBOMACHINE COMPONENTS

(71) Applicant: NUOVO PIGNONE TECNOLOGIE—S.R.L., Florence (IT)

(72) Inventors: Michele Sale, Florence (IT); Massimo Guerrini, Massa (IT); Francescosaverio Chiari, Florence (IT); Paolo Mola, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 300 days.

(21) Appl. No.: 17/307,703

(22) Filed: May 4, 2021

(65) Prior Publication Data

US 2021/0252596 A1     Aug. 19, 2021

Related U.S. Application Data

(63) Continuation of application No. PCT/EP2019/025391, filed on Nov. 7, 2019.

(30) Foreign Application Priority Data

Nov. 9, 2018   (IT) .......................... 102018000010201

(51) Int. Cl.
*B22F 12/30* (2021.01)
*B33Y 10/00* (2015.01)
(Continued)

(52) U.S. Cl.
CPC .............. *B22F 12/30* (2021.01); *B22F 5/009* (2013.01); *B22F 10/25* (2021.01); *B22F 10/28* (2021.01);
(Continued)

(58) Field of Classification Search
CPC .......... B22F 12/30; B22F 5/009; B22F 10/25; B22F 10/28; B22F 10/47; B22F 10/36;
(Continued)

(56) References Cited

U.S. PATENT DOCUMENTS

| | | |
|---|---|---|
| 2013/0004680 A1 | 1/2013 | Godfrey |
| 2016/0237827 A1 | 8/2016 | Campbell et al. |

(Continued)

FOREIGN PATENT DOCUMENTS

| | | |
|---|---|---|
| RU | 2593312 C2 | 8/2016 |
| WO | 2015/181080 A1 | 12/2015 |
| WO | 2018/005889 A2 | 1/2018 |

*Primary Examiner* — Yi-Kai Wang
(74) *Attorney, Agent, or Firm* — Paul Frank + Collins P.C.

(57) ABSTRACT

A method of making hollow turbomachine components is disclosed. The method provides for an additive manufacturing step, wherein on a substrate the following are manufactured in sequence: a first terminal portion of a semi-finished component, said first terminal portion adhering to said substrate, an intermediate portion adjoining the first terminal portion, and a second terminal portion adjoining the intermediate portion. After cooling of the component, at least one of said first terminal portion and second terminal portion is removed. The removed terminal portion includes sacrificial features, where thermally induced deformations of the component are concentrated, or which are aimed at stiffening the component, such that deformations are reduced or prevented.

12 Claims, 9 Drawing Sheets

(51) Int. Cl.
*B33Y 80/00* (2015.01)
*B22F 10/28* (2021.01)
*B22F 5/00* (2006.01)
*B22F 10/25* (2021.01)
*B22F 10/47* (2021.01)
B22F 12/41 (2021.01)
B22F 12/37 (2021.01)
B22F 10/36 (2021.01)
B22F 10/66 (2021.01)

(52) U.S. Cl.
CPC .............. *B22F 10/47* (2021.01); *B33Y 10/00* (2014.12); *B33Y 80/00* (2014.12); *B22F 10/36* (2021.01); *B22F 10/66* (2021.01); *B22F 12/37* (2021.01); *B22F 12/41* (2021.01)

(58) Field of Classification Search
CPC .......... B22F 10/66; B22F 12/37; B22F 12/41; B22F 3/105; B33Y 10/00; B33Y 80/00; Y02P 10/25
USPC ........................................................ 416/179
See application file for complete search history.

(56) References Cited

U.S. PATENT DOCUMENTS

| | | |
|---|---|---|
| 2016/0319690 A1 | 11/2016 | Lin et al. |
| 2017/0129012 A1* | 5/2017 | Ishida ..................... B22F 10/16 |
| 2018/0202663 A1* | 7/2018 | Daniel .................... F23R 3/283 |
| 2018/0221958 A1* | 8/2018 | Torun ................. B23K 26/0006 |
| 2018/0375296 A1* | 12/2018 | Zediker ................ H01S 5/4062 |

* cited by examiner

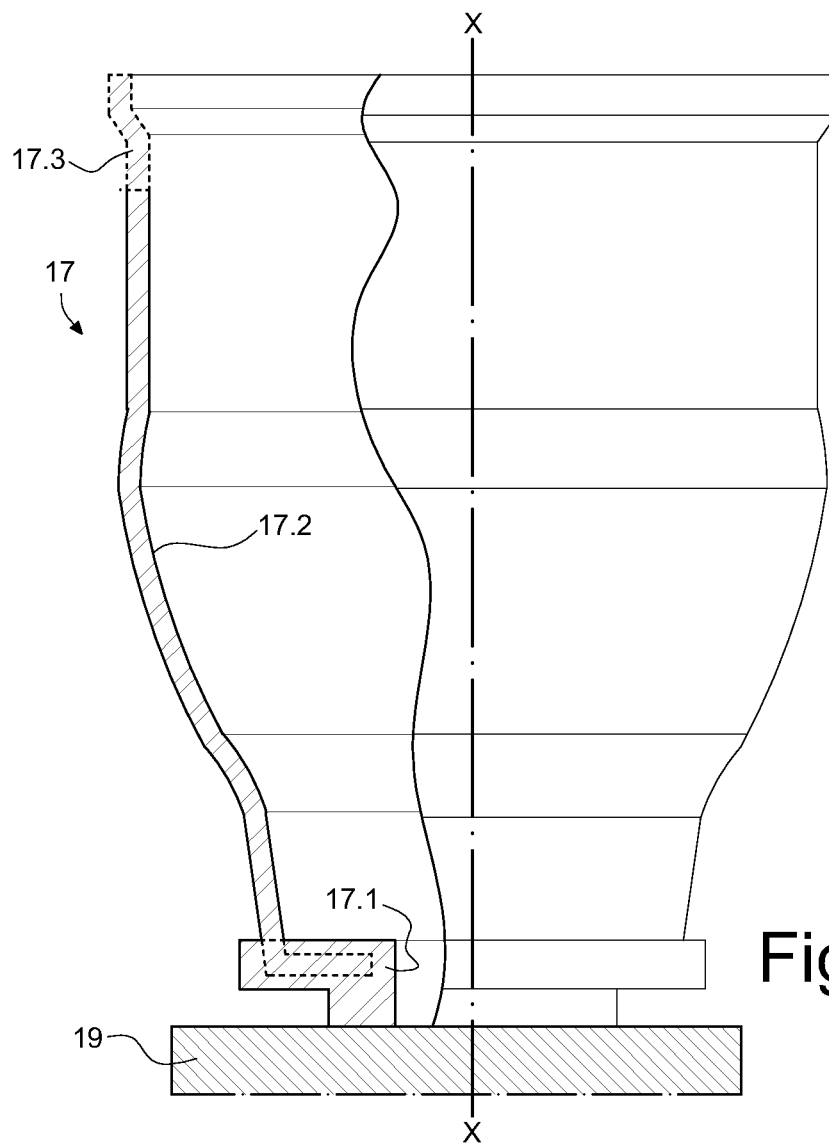
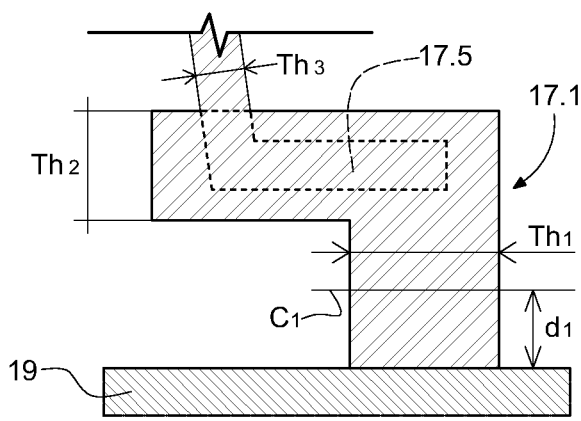
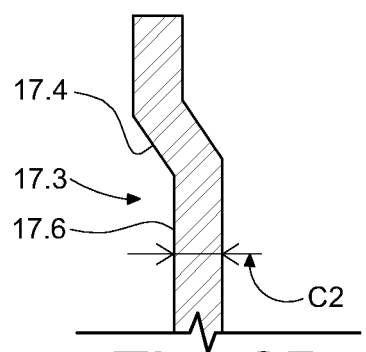
Fig. 2
Fig. 2A
Fig. 2B

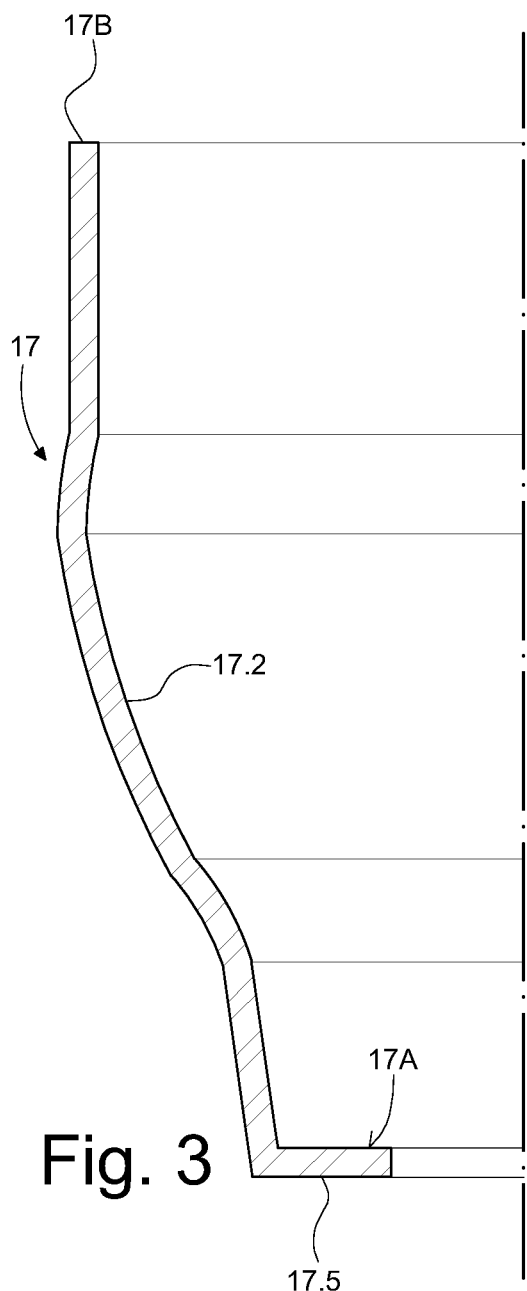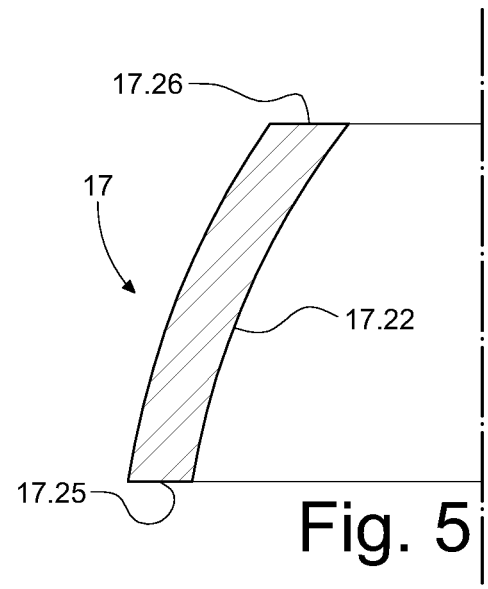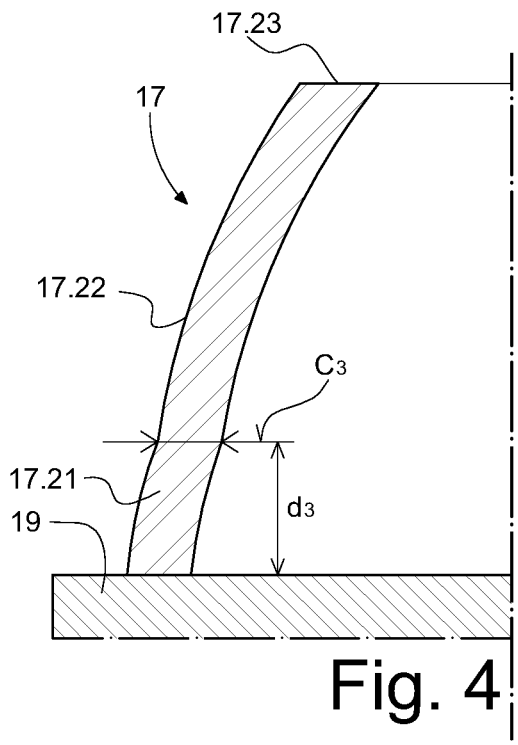

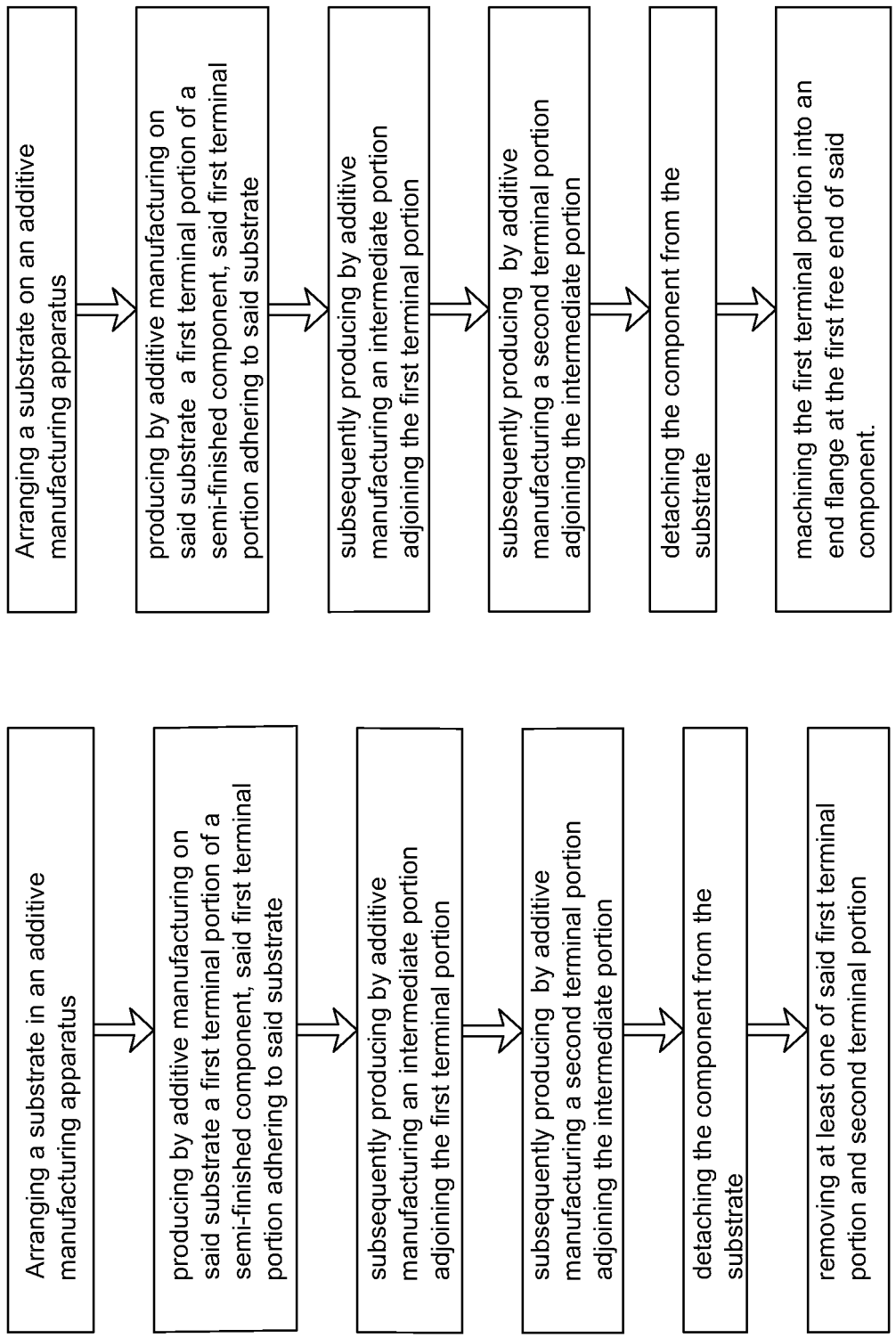

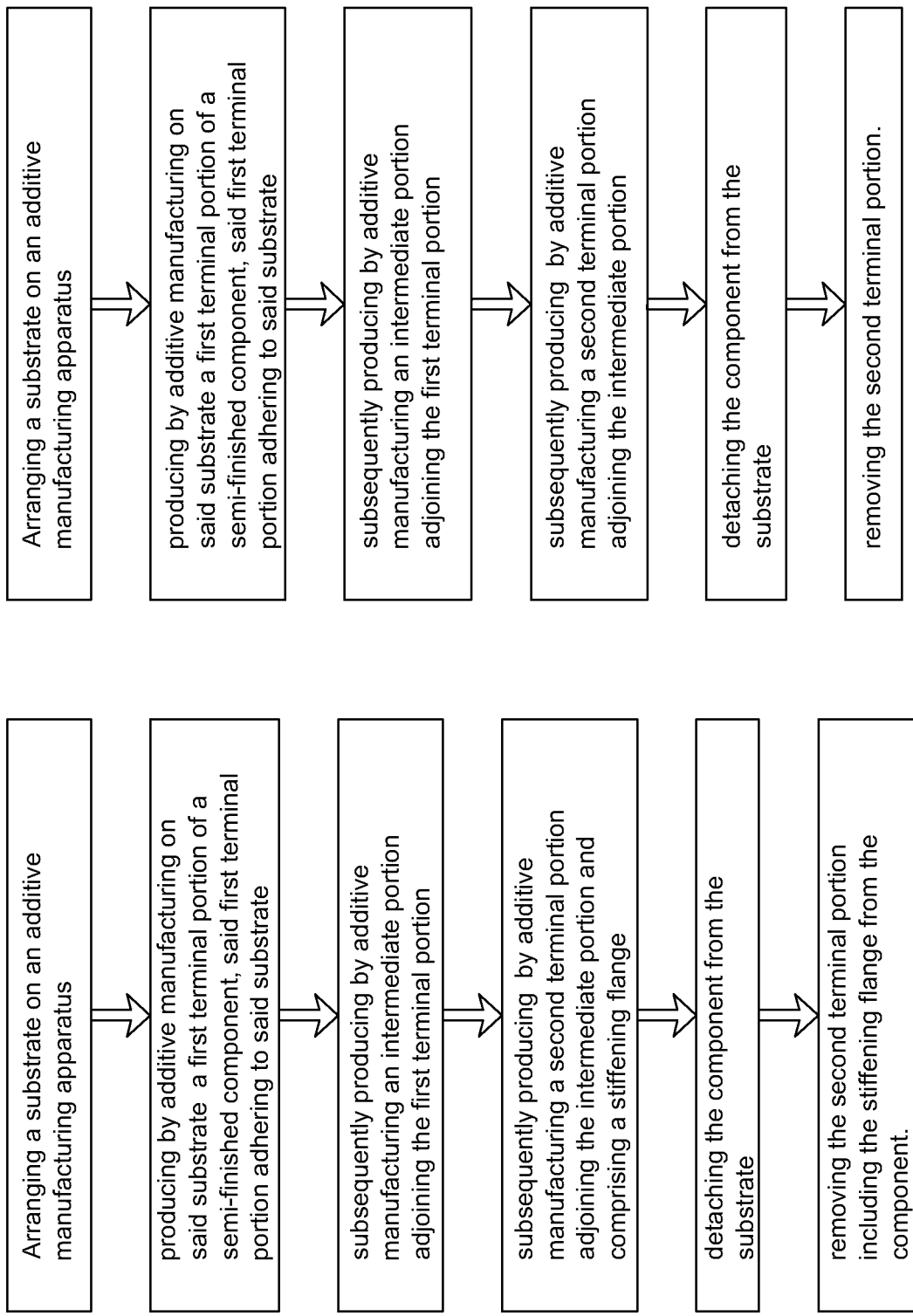

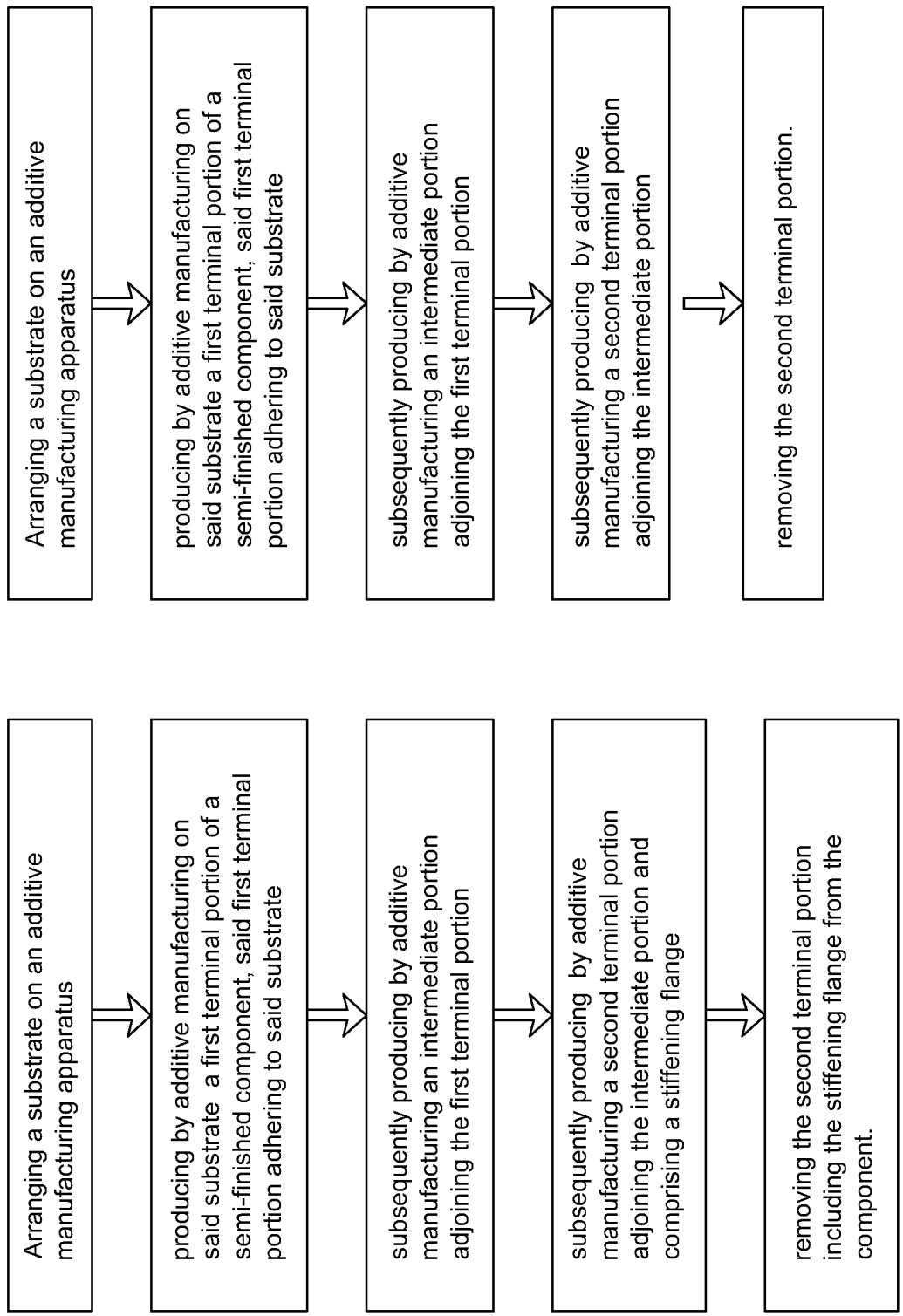

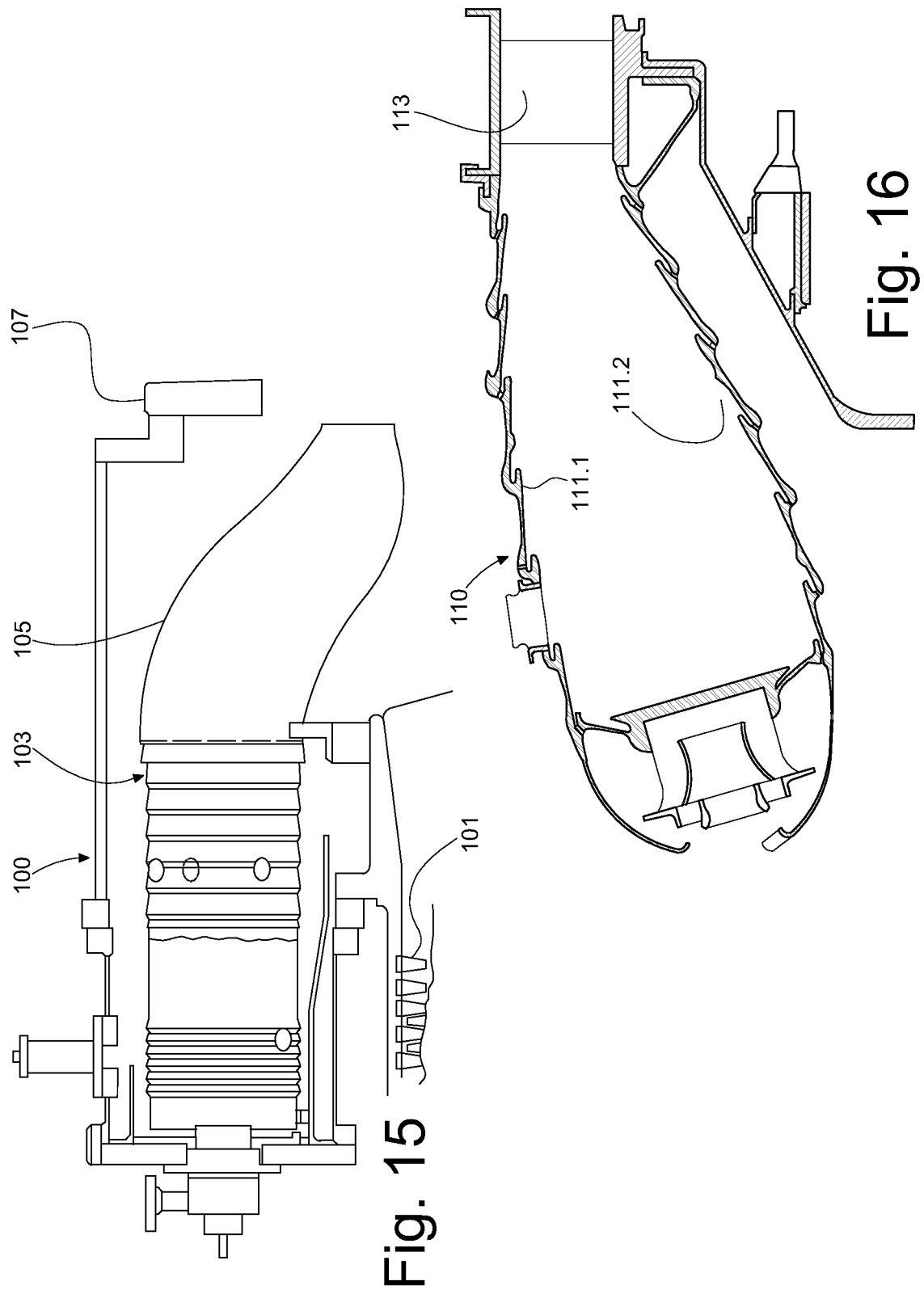

METHOD FOR PRODUCING HOLLOW, LARGE DIMENSIONAL TURBOMACHINE COMPONENTS

CROSS-REFERENCE TO RELATED APPLICATIONS

This application is the U.S. national stage application filed pursuant to 35 U.S.C. 365(c) and 120 as a continuation of International Patent Application No. PCT/EP2019/025391, filed Nov. 7, 2019, which application claims priority from Italian Patent Application No. 102018000010201, filed Nov. 9, 2018, which applications are incorporated herein by reference in their entireties.

TECHNICAL FIELD

Disclosed herein are improved methods of producing components using additive manufacturing. Specifically, the disclosure provides an improved method of producing thin-walled hollow components, for decreased manufacturing time, decreased costs and decreased waste of materials.

BACKGROUND ART

Additive manufacturing techniques have been proposed in several fields of manufacturing. Specifically, additive manufacturing has been suggested for producing annular or cylindrical components of turbomachines, such as for instance flanges and casings of compressor and turbine sections. These are thick and large pieces of machinery, which must withstand high internal pressure and high temperature conditions, and which shall also be sufficiently strong to resist the impact of any rotating blade that may break inside the turbomachine. US2018/0221958 discloses methods for producing parts of turbomachines using hybrid additive manufacturing techniques.

Additive manufacturing is advantageous for manufacturing thick outer annular components, of turbomachines, in that additive manufacturing techniques offer high geometric flexibility when compared to subtractive manufacturing techniques or casting techniques. Additive manufacturing further may offer cost savings and flexibility in enabling changes to be made during the production process without re-tooling.

However, additive manufacturing suffers from limitations in manufacturing thinwalled components, mainly due to the high thermally induced stresses and consequent deformations caused by the additive manufacturing process.

Thin-walled components, such as turbomachine components having wall thickness about or below 10 mm, e.g. about or below 5 mm are usually manufactured by forging, metal spinning or welding of pre-formed sheets. Shape tolerance control represents the main issue to date.

A need therefore exists to improve the manufacturing of think-walled, large diameter components, typically parts of turbomachines.

SUMMARY

Disclosed herein is a method of making a hollow turbomachine component, comprising the step of sequentially producing by additive manufacturing on a substrate: a first terminal portion of a semi-finished component, said first terminal portion adhering to the substrate; an intermediate portion adjoining the first terminal portion; and a second terminal portion adjoining the intermediate portion. The method further comprises the step of removing at least one of said first terminal portion and second terminal portion. The removed terminal portion may include a feature, not forming part of the final component to be manufactured, but which is aimed at reducing thermally induced stresses and deformations in the final component. In some embodiments, the removed terminal portion can include a stiffening feature, for instance a stiffening flange. In other embodiments, the removed terminal portion includes an add-on portion of metallic material, in which thermally induced deformations concentrate, such that the actual final component, obtained once the terminal portion has been removed, is free or substantially free of deformations.

Further features and embodiments of the method according to the present disclosure are described in the following detailed description and are set forth in the appended claims.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 2 illustrates a cross sectional view of a semi-finished component produced by additive manufacturing in one embodiment;

FIGS. 2A and 2B illustrate enlargements of terminal portions of the semi-finished component of FIG. 2;

FIG. 3 illustrates a cross-sectional view of the component obtained by removing terminal portions of the semi-finished component of FIG. 2;

FIG. 4 illustrates a cross-sectional view of a further embodiment of a semi-finished component produced by additive manufacturing in a further embodiment;

FIG. 5 illustrates a cross-sectional view of the component obtained by removing a terminal portion of the semi-finished component of FIG. 4;

FIGS. 6, 7, 8, 9, 10, 11, 12, 13 and 14 show flowcharts of methods according to the present disclosure; and FIGS. 15 and 16 show schematic cross-sectional views of canned and annular combustion chambers, respectively, and relevant components thereof, which may be manufactured with the methods disclosed herein.

DETAILED DESCRIPTION

Figure 1:
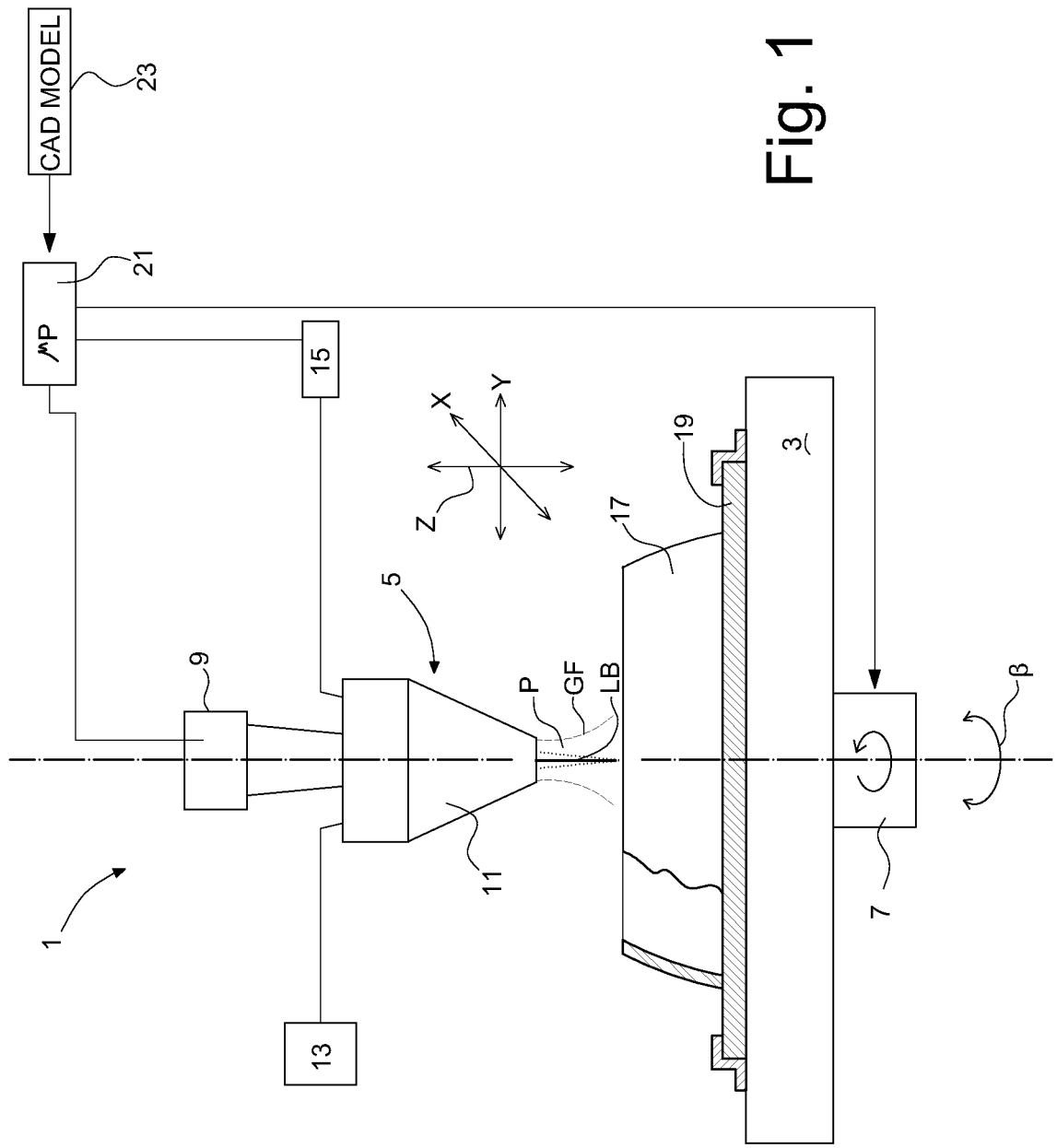
FIG. 1 illustrates a schematic of a powder laser metal deposition apparatus.
Figures 10, 11:
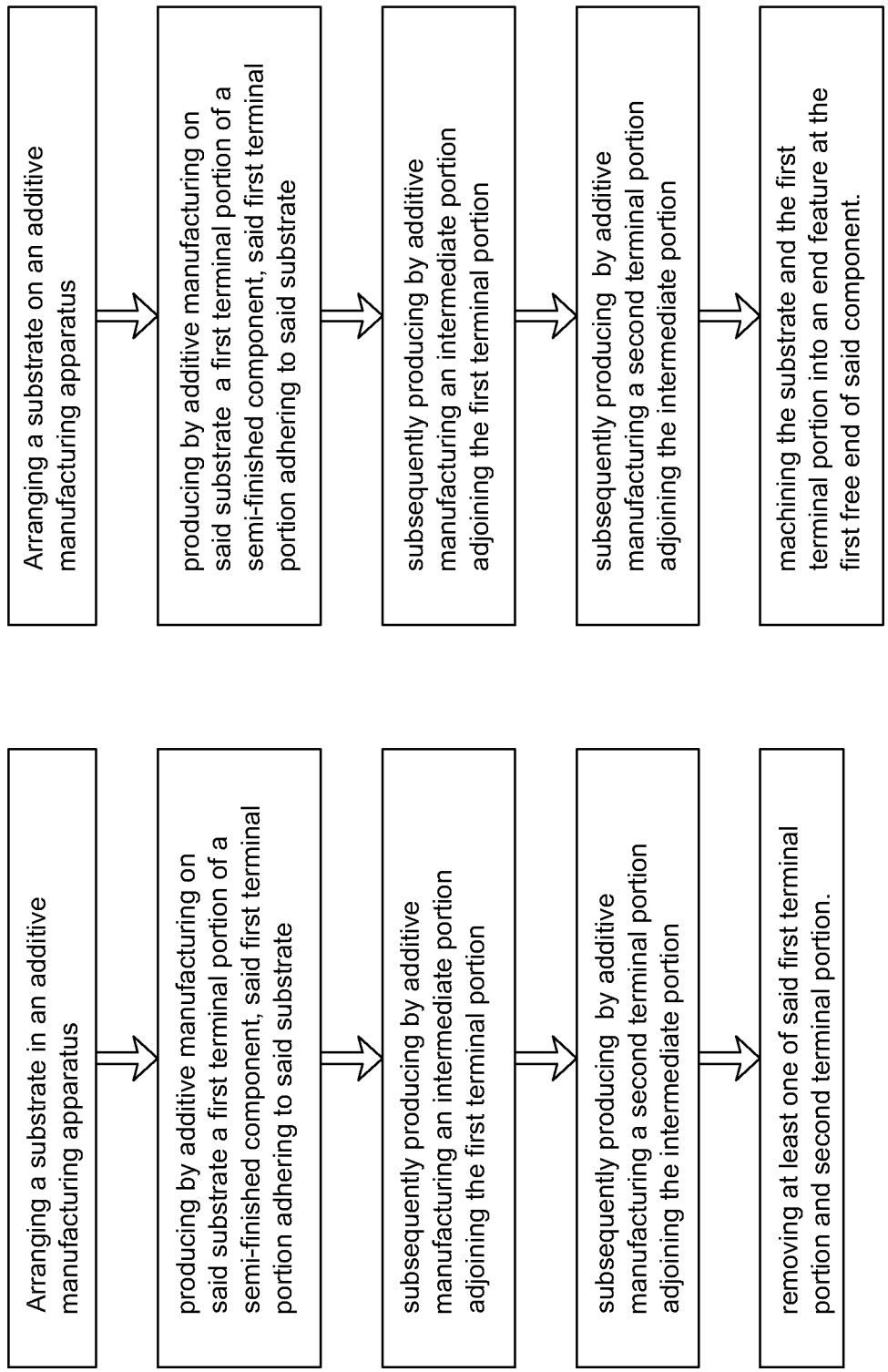

In order to reduce manufacturing costs and manufacturing time, as well as to achieve enhanced manufacturing flexibility of large, thin-walled turbomachine components, the method disclosed herein provides for steps aimed at reducing or avoiding thermally induced deformations, such as buckling, of the final component, such that a net shape or near net shape component can be obtained at the end of the additive manufacturing procedure.

Since thermally induced deformations concentrate at one or both terminal portions of the component produced by additive manufacturing, the method disclosed herein provides for producing a semi-finished component, which includes at least one terminal portion that will be removed therefrom. Such sacrificial terminal portion can be designed so that inadmissible deformations, i.e. those deformations which would not be acceptable in the finished product, are located entirely in the sacrificial terminal portion, which is removed upon cooling of the component. In some embodiments, the sacrificial terminal portion is configured to stiffen the component such that thermally induced deformations are prevented or substantially reduced.

For this purpose, a three-dimensional model of the final component can be provided, which includes additional features, to be removed from the final component. In a nutshell, a computer aided design 3D-model (CAD model) can be created, which includes additional removable features at one or both ends thereof. The additive manufacturing apparatus runs under the control of a computer based on the CAD model, such that the final product obtained by additive manufacturing includes one or more removable features, where deformations, such as buckling, shrinkage or other thermally induced deformations concentrate. By removing those portions a net shape or near net shape component is obtained.

By concentrating deformations or artifacts provoked by thermally induced stresses in sacrificial terminal features, large and thin-walled components can be produced by additive manufacturing.

Components, which according to the current art are manufactured by pre-formed sheet welding, or direct machining from semi-finished workpieces produced by forging or metal spinning, can thus be produced by additive manufacturing with beneficial effects in terms of cost reduction, reduced lead time, reduced time to test new components, and also in terms of reduced component thickness.

Selective laser sintering, direct laser sintering, selective laser melting and direct laser melting are common industry terms used to refer to producing three-dimensional (3D) objects by using a laser beam to sinter or melt a fine powder. For example, U.S. Pat. Nos. 4,863,538 and 5,460,758 disclose conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. In general, the abovementioned processes are performed on a reusable or sacrificial substrate. In the abovementioned processes, conventionally, the build platform is removed from the component formed after a component build is complete.

Methods disclosed herein preferably use powder laser metal deposition, which may result in a more accurate net shape component, such that in some embodiments, high surface quality and low surface roughness can be achieved without the need to resort to surface polishing treatments, or other costly and time consuming finishing steps.

Turning now to the drawings, FIG. 1 is a schematic diagram showing an exemplary powder laser metal deposition apparatus 1 for additive manufacturing. The apparatus 1 comprises a table 3 and a head 5. The table 3 can be configured to rotate around a rotation axis A-A, for instance under the control of a motor 7. In some embodiments, the table 3 can also be controlled to tilt around tilting axes, e.g. a horizontal axis, according to arrow B. The tilting axis B can be a numerically controlled axis.

The head 5 comprises an energy source 9, for instance an electron beam gun, a plasma source, or preferably an electromagnetic radiation source. Particularly advantageous embodiments of the methods disclosed herein use lasers as power sources. The head 5 further comprises a nozzle 11 connected to a powder feed source 13 and a source of shield gas 15. Powder material 52 is fed though the nozzle 11 by powder feed source 13. Powder P from the powder feed source 13 is fed along with shield gas G from shield gas source 15 through the nozzle 11. As the powder is fed through nozzle 11, the powder is melted into a melt pool M by energy from source 9, for example a laser beam LB.

Manufacturing of a component 17 can start from a substrate 19, which can be attached to table 3, such as to move integrally therewith during the manufacturing process.

Starting from the substrate 19, metal powder P is melted in pool M and subsequently solidified. By moving the head 5 and the table 3 one with respect to the other, layers of melted powder can be superposed on the substrate or on previously solidified parts.

Either the head 5, the table 3 and substrate 19, or both may be lowered and/or moved, to melt the powder P on any portion of the substrate 19 and/or on the previously solidified portion of component 17, until the component 17 is completely built up from a plurality deposited layers built from melted powder P. Specifically, for manufacturing axially symmetrical components 17, the table 3 and the substrate 19 are kept into rotation around the vertical axis A-A and the head 5 and table 3 are moved according to three mutually orthogonal, numerically controlled axes X, Y, Z. Tilting around the numerically controlled tilting axis, i.e. rotation axis, B may be useful to produce flanged sections of the component 17. In some embodiments more numerically controlled rotation axes can be provided.

The method disclosed herein can be particularly useful for the manufacturing of thin-walled, axially symmetrical turbomachine components. However, several turbomachine thin-walled components may have a hollow non-symmetrical shape. This is particularly the case of so-called transition pieces of canned combustors of gas turbine engines, as will be described later on. The method disclosed herein attains several advantages also in the manufacturing of such asymmetrical components. In such case, manufacturing will be through more complex mutual movements of the table 3 and the head 5 of the additive manufacturing apparatus 1.

The energy source 9 and the numerically controlled axes X, Y, Z, B as well as the motor 7 may be controlled by a computer system schematically shown at 21, including a processor and a memory. The computer system 21 may determine a predetermined path for each melt pool and subsequently solidified bead to be formed, and energy source 9 to irradiate the powder material according to a pre-programmed path.

The abovementioned additive manufacturing process may be controlled by the computer system 21 executing a control program. The computer system 21 can receive, as input, a three-dimensional model 23 of the component 17 to be formed. For example, the three-dimensional model is generated using a computer aided design (CAD) program. The computer system 21 analyzes the model 23 and generates movements according to numerically controlled axes X, Y, Z, B according to the model 23 to manufacture the component 17.

The above described additive manufacturing process involves concentration of energy and high temperature gradients within the component 17 being formed. Subsequent solidification of the superposed layers generates thermally induced stresses in the solidified component. Stress release processes and post processing procedures are usually required. The geometry of the component 17 must be such that thermally induced stresses do not generate deformations of the component, which would result in the shape of the component 17 being inconsistent with the 3D model. Thermally induced stresses and consequent deformations of the component after solidification represent a major obstacle in the manufacturing of large, thin-walled components, which are unable to withstand high thermally induced stresses and would be subject to buckling or deformation.

According to the method disclosed herein, a novel approach to additive manufacturing is suggested, which overcomes the limitations of the current art techniques and allows using additive manufacturing also for the production of thin-walled, large diameter components of axially symmetrical or non-symmetrical shape, such as combustor liners, annular combustion chamber components, transition pieces, or other thin-walled components of turbomachinery, in particular turbomachinery components arranged inside or around the hot combustion gas path In general terms, the 3D-model used to control the additive manufacturing apparatus 1 includes portions or features, which are not intended to be part of the final component 17. These portions or features, therefore, generate sacrificial parts of the component 17, i.e. parts intended to be removed from the final component, and are designed such that thermally induced deformations concentrate therein and are moved away from the remainder of the component. In so doing, thermally induced deformations will localize in the sacrificial parts, rather than in the actual final component to be manufactured.

In some embodiments, the sacrificial feature may include a portion of larger thickness, which does not deform under thermally induced stresses, or a portion, the shape whereof is such as to increase stiffness and thus reduce the thermally induced deformations of the component, or limit the deformations to a removable part of the semi-finished component generated by the additive manufacturing apparatus 1.

In some embodiments, the sacrificial part adds a variation of the transverse dimension of a hollow component. The variation of the transverse dimension has a stiffening effect on the thin-walled structure of the component. For instance, an axially symmetrical piece of machinery having a substantially constant diameter is prone to thermally induced deformation. The addition thereon of an end portion of conical shape, having a variable diameter dimension, or in general a portion of non-constant diameter, stiffens the structure against buckling or other thermally induced deformations. Upon cooling of the component, the conical end portion can be removed. A similar effect can be achieved also if the component is non-symmetrical. In general terms, the rigidity of the wall against buckling or other deformations can be increased by forming thereon a transitional piece, which introduces a dimensional discontinuity.

The position and dimension of the sacrificial parts or features are such that residual deformations in the final component are negligible, i.e. within the dimension and shape tolerances. Upon solidification of the semi-finished component, the sacrificial features or parts thereof are removed along with the thermally induced deformations, which concentrate therein.

FIG. 3 shows a cross-sectional view of a large, thin-walled component 17, for instance an axially symmetrical component of a combustor for a gas turbine. The component 17 of FIG. 3 is illustrated by way of example only. Those of ordinary skill in the art will understand that the design approach described below with respect to the exemplary component 17 of FIG. 3 can be used for manufacturing a variety of different axially symmetrical or non-symmetrical components.

The component 17 of FIG. 3 is obtained by additive manufacturing of a semi-finished component having sacrificial portions at both ends thereof, and by subsequently removing said sacrificial portions. By way of example, the component 17 of FIG. 3 has a main body of axially symmetrical shape. The longitudinal axis of the component 17 is indicated as X-X. The component 17 in FIG. 3 has a first end 17A and a second end 17B. More specifically, the first end 17A comprises a flange facing radially inwardly towards the axis X-X, and the second end 17B terminates a substantially cylindrical portion of the component 17, i.e. a portion of constant diameter.

The finished component 17 is obtained starting from a CAD 3D-model of the component, which is used by the additive manufacturing apparatus 1 to generate a semi-finished article of manufacture, including end sacrificial portions, which are removed after cooling. The semi-finished component 17 is shown in FIG. 2.

Since FIG. 2 represents the semi-finished component 17 generated by the additive manufacturing apparatus 1 under the control of the computer system 21 using the 3D-model 23, the shape of the virtual 3D-model is the same as the shape of the semi-finished component 17 obtained at the end of the additive manufacturing process, except for thermally induced deformations which will appear in the solidified semi-finished component. Thus, the following description of the shape of the semi-finished component 17 applies to both the virtual 3D-model of the component and to the solidified semi-finished component 17 generated by the additive manufacturing apparatus 1.

The semi-finished component 17 generated by the 3D-model 23 and the virtual component defined by such model both include a first terminal portion 17.1, an intermediate portion 17.2 and a second terminal portion 17.3. Manufacturing starts by producing the first terminal portion 17.1 on the substrate 19. In the exemplary embodiment of FIG. 2, the first terminal portion 17.1 has the shape of a sacrificial flange. As better shown in the enlargement of FIG. 2A, the first terminal portion 17.1 is in the form of a flange with an L-shaped cross section. As will be clarified later on, the flange will be machined to generate an end flangeshaped portion of the final component. In some embodiments, the thicknesses Th1, Th2 of the several flange portions are larger than the thickness Th3 of the intermediate portion 17.2 of the component 17.

The second terminal portion 17.3 of the semi-finished component 17 is better shown in the enlargement of FIG. 2B. In the exemplary embodiment of FIGS. 2, 2B, the second terminal portion 17.3 includes a stiffening feature, i.e. a sacrificial portion of the semi-finished component, which has the purpose of increase the overall stiffness and resistance against thermally induced deformations of the thin-walled component. In the embodiment of FIGS. 2, 2B the stiffening feature includes a conical stiffening flange 17.4, having a smaller diameter adjoining the intermediate portion 17.3 of the component 17 and a larger diameter facing away from the intermediate portion 17.3 and forming the free end of the semi-finished component 17 generated by additive manufacturing on apparatus 1.

In general terms, a stiffening feature may include a portion of the wall of the semifinished component exhibiting a smooth or preferably stepped variation of the cross-sectional dimension of the component.

Both terminal portions 17.1 and 17.3 include or represent sacrificial features, i.e. parts which are removed from the semi-finished component 17 of FIG. 2 to obtain the finished component 17 as shown in FIG. 3.

More specifically, after solidification and cooling the semi-finished component 17 can be removed from the substrate 19 by cutting. Cutting can be performed along a plane C1 through the first terminal portion 17.1, for instance at a distance dl from the substrate 19 and parallel thereto, i.e. orthogonal to the longitudinal axis X-X of the component 17. Since the final component 17 includes a thin flange 17.5 at a first end 17A thereof, as shown in FIG. 3, a part of the first terminal portion 17.1, which remains after cutting away from the substrate 19, is removed by machining, until the final thin flange 17.5 is obtained.

Thermal stresses generated during additive manufacturing of the first section of the component 17 will concentrate in the thicker, first end portion 17.1, which is removed by cutting and machining. The thin wall of component 17 projecting from the thicker, first terminal portion 17.1 is free or substantially free of thermally induced deformations and thus represents a net shape portion of the final component 17. As used herein, a portion "substantially free of thermally induced deformations" can be understood as one where any residual deformation is within admitted manufacturing tolerances.

The free second terminal portion 17.3 may be subject to buckling caused by the thermally induced stresses which, generate during cooling of the semi-finished component 17. This may be specifically the case if the diameter, or more generally speaking the shape of the cross-section of the component, is constant in the area adjoining the second end of the component. Buckling may alter the shape of the final component with respect to the desired shape to such an extent that the finished component must be discarded. To prevent buckling deformations from altering the shape of the final component, the 3D-model and thus the semi-finished component may include an additional portion represented by the second terminal portion 17.3, which is removed by cutting along a plane C2. The sacrificial second terminal portion 17.3, which is removed from the intermediate body 17.2 of component 17, includes the conical stiffening flange 17.4, or other sacrificial stiffening feature, and may further include an annular metal part 17.6 (FIG. 2B) between the conical stiffening flange 17.4 and the intermediate body 17.2 of the component 17.

The stiffening flange 17.4 reduces the thermally induced buckling deformation of the free end of the component 17, such that the axial length of the side wall of the component subject to buckling is smaller than would be if no stiffening flange 17.4 were provided. The deformed annular portion is located between the conical stiffening flange 17.4 and the cutting plane C2, along which the semi-finished component 17 is cut to remove the second sacrificial part 17.4 and produce the second free end 17B (FIG. 3) of the final component 17. Thus, the deformed part of the semi-finished component 17 is removed by cutting along plane C2, along with the remaining sacrificial part, including the stiffening flange 17.4 or other stiffening feature.

Thus, can be observed by comparing FIGS. 2 and 3, the final component 17 (FIG. 3) differs from the semi-finished component 17 (FIG. 2) and from the 3D-model thereof, as it is devoid of the sacrificial first and second terminal portions 17.1 and 17.3.

After removal of the sacrificial portions the resulting piece of machinery is a net shape component or near net shape component, which does not require additional chip removal machining to achieve its final shape. If required, surface machining such as sandblasting, polishing, shot peening, or the like can be performed to improve the surface texture of the final component 17.

The shape of the sacrificial terminal portions 17.1 and 17.3 shown in FIGS. 2, 2A, 2B is functional to the actual shape of the final component 17. The sacrificial portions or features may differ depending upon the shape of the net shape component 17 which shall be manufactured.

A further example of thin-walled component is shown in FIGS. 4 and 5. More specifically, FIG. 4 illustrates the semi-finished component 17 produced with the by additive manufacturing apparatus 1 of FIG. 1, for instance. The shape of the semi-finished component 17 of FIG. 4 corresponds to the virtual 3D-model used to control the additive manufacturing apparatus 1, except for the thermally induced deformations. FIG. 5 illustrates the finished component 17 after removal of a sacrificial portion as described in more detail below.

In the exemplary embodiment of FIG. 4, the semi-finished component 17 comprises a first terminal portion 17.21, an intermediate portion 17.22 and a second terminal portion 17.23. Additive manufacturing starts with the first terminal portion 17.21 which grows from the substrate 19, forming the intermediate portion 17.22 and ends with the second terminal portion 17.23. In the exemplary embodiment of FIGS. 4 and 5, the final component 17 comprises a first free end 17.25 having a larger diameter and a second free end 17.26 having a smaller diameter. The component 17 has therefore a tapering shape, with a smaller diameter at the second free end 17.26.

A component 17 having the shape shown in FIG. 4 is subject to thermally induced deformations at the bottom thereof, i.e. proximate the substrate 19. At a distance d3 from the substrate 19 the component 17 shrinks resulting in a reduced diameter. In order to obtain a net shape or near net shape component 17, therefore, the 3D-model of the component in this case includes a sacrificial terminal portion 17.21, which is intended to be removed after cooling of the semi-finished component 17. Removal can be obtained by detaching the component 17 from the substrate 19 through cutting along a plane C3 at a distance d3 from the substrate 19 and parallel thereto.

FIG. 5 illustrates the net shape component 17 obtained by cutting and removing the sacrificial first terminal portion 17.21 along plane C3. The final component 17 has a first free end 17.25 and a second free end 17.26, which in this specific case is formed by the second terminal portion 17.23, which does not require to be removed, since it is substantially free of thermally induced deformations, i.e. the thermally induced deformations are within acceptable shape and dimension tolerances of the final piece of machinery.

By providing removable terminal portions, where thermally induced deformations concentrate, additive manufacturing of thin-walled components having an extensive transverse dimension become possible. By transverse dimension, the largest dimension of the cross-section of the component can be understood. In case of an axially symmetrical component, the transverse dimension can be the diameter of the section thereof along a plane orthogonal to the axis of symmetry of the component. The components 17 may have a maximum transverse equal to or preferably larger than about 500 mm. For instance, the largest transverse dimension can range between about 500 mm and about 3000 mm, preferably between about 500 mm and about 2000 mm. The wall thickness can range for instance between about 0.5 mm and about 5 mm, preferably between about 1 mm and about 4 mm.

Metal superalloy powder can be used for producing components intended to withstand high temperatures, such as combustor components.

The net shape component 17 obtained after cutting/removing the sacrificial feature(s) has its final thickness and does not require further material removing machining to achieve its final shape. However, while the component 17 is obtained in its net shape, additional drilling, cutting or other machining operations to produce additional elements thereon are not excluded.

During additive manufacturing the component 17 can be provided also with additional features such as bosses, springs, projections, tooling features, or appurtenances, which may be useful for subsequent operations and which can be removed.

Based on the above described exemplary embodiments, those skilled in the art will understand that the method disclosed herein can be used in a variety of situations, where it may be desirable to manufacture by additive manufacturing hollow components having a thin wall, and large transverse dimensions, for example a large diameter in case of axially symmetrical components. The shape of the 3D-model will be adapted to the thermally induced stresses and consequent thermally induced deformations arising in the final component. Such stresses and deformations depend upon the component shape and dimensions. In general terms, the 3D-model will include removable features, i.e. sacrificial parts, at one or both ends of the component, such that deformations will be either prevented or reduced by removable stiffening features and/or will be confined in those sections and portions of the additively manufactured component, which will be removed after cooling.

FIG. 6 illustrates a flowchart summarizing an additive manufacturing method according to the present disclosure. The method includes a step of arranging a substrate in an additive manufacturing apparatus and a subsequent step of producing by additive manufacturing thereon a component starting with a first terminal portion, followed by a central or intermediate portion and ending with a second terminal portion. The method further comprises a step of detaching the component thus formed from the substrate and an additional step of removing at least one of the first terminal portion and second terminal portion. In some embodiments, both terminal portions may be removed, for instance if both said terminal portions include sacrificial feature(s). Removing may involve cutting away or machining by material removal, to change the shape and dimension of the terminal portion, for instance to produce a thin-walled flange therefrom.

FIG. 7 illustrates a further flowchart of another embodiment of a method according to the present disclosure. The method of FIG. 7 comprises producing by additive manufacturing on said substrate arranged in an additive manufacturing apparatus a first terminal portion of a semi-finished component and subsequently producing by additive manufacturing a central or intermediate portion adjoining the first terminal portion, followed by a second terminal portion adjoining the intermediate portion. The semi-finished component is then detached from the substrate and the first terminal portion thereof is machined into an end flange.

FIG. 8 illustrates a yet further flowchart summarizing another embodiment of a method according to the present disclosure. Once a substrate has been arranged in an additive manufacturing apparatus, the method comprises producing by additive manufacturing on said substrate a first terminal portion of a semi-finished component, said first terminal portion adhering to said substrate. The method further comprises producing by additive manufacturing a central or intermediate portion adjoining the first terminal portion as well as a second terminal portion adjoining the central or intermediate portion and comprising a stiffening feature, for instance a stiffening flange. The component is then detached from the substrate and the second terminal portion including the stiffening feature is removed from the component.

FIG. 9 illustrates a flowchart of another embodiment of a method according to the present disclosure, wherein a substrate is arranged in an additive manufacturing apparatus. On said substrate a first terminal portion of a semi-finished component is produced by additive manufacturing, followed by further additive manufacturing steps, including producing a central or intermediate portion adjoining the first terminal portion, and a second terminal portion adjoining the central or intermediate portion. The component thus formed is detached from the substrate and the second terminal portion is removed.

The methods of FIGS. 6, 7, 8 and 9 include a step of removing the component produced by additive manufacturing from the substrate. This latter can be a sacrificial support. In other embodiments, the step of detaching the component from the substrate can be omitted and the substrate can become part of the final component. In some embodiments, the manufacturing method can include a further step of machining the substrate to produce a terminal portion of the component. FIGS. 10, 11, 12 and 13 illustrate flowcharts of modified embodiments of the methods of FIGS. 6, 7, 8 and 9, wherein the step of detaching the component from the substrate is omitted and replaced by a step of machining the substrate to obtain an end structural feature of the final component.

Figure 14:
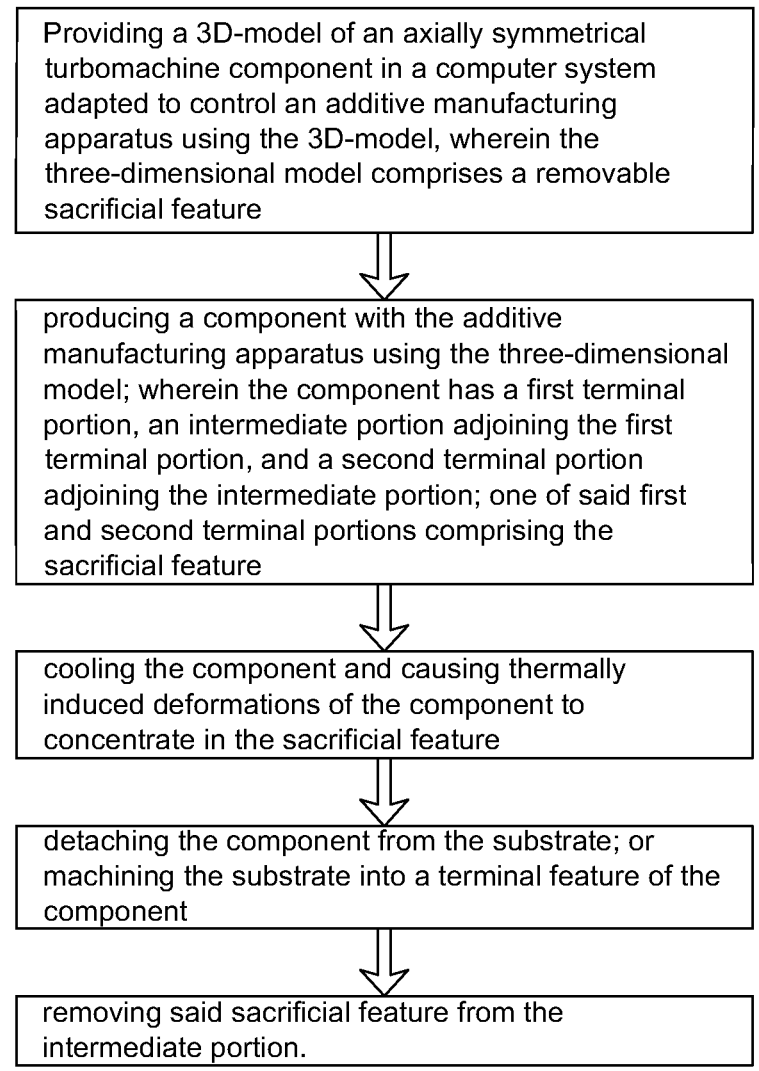

In general, the methods disclosed herein may include a step of generating a 3D-model of component to be produced, which model includes one or more removable features and is loaded in a computer system of the additive manufacturing apparatus or machine 1, for controlling the additive manufacturing process. FIG. 14 illustrates a flowchart of a method including the step of providing the 3D-model of a turbomachine component 17 in a computer system 21 adapted to control the additive manufacturing apparatus 1 using the 3D-model, wherein the three-dimensional model comprises at least one removable sacrificial feature. The method may then include further steps as disclosed in one or more of FIGS. 6, 7, 8, 9, 10, 11, 12 and 13.

In some embodiments, as shown in FIG. 14, the method includes the step of producing a component 17 with the additive manufacturing apparatus 1 using the three-dimensional model, wherein the component 17 has a first terminal portion, a central or intermediate portion adjoining the first terminal portion, and a second terminal portion adjoining the central or intermediate portion; one of said first and second terminal portions comprising the sacrificial feature. The method includes a further step of cooling the component and causing thermally induced deformations of the component to concentrate in the sacrificial feature, such that the thermally deformed portion of the component can be removed by detaching the component from the substrate and removing said sacrificial feature from the central or intermediate portion of the component.

In all methods summarized in FIGS. 6, 7, 8, 9, 10, 11, 12, 13 and 14 at least some of the steps can be re-arranged in a different sequence. For instance, the step of removing or machining the substrate can be performed after the step of removing the second terminal portion.

As described above, the component 17 can be a part of a turbomachine, for instance a component of a combustor of a gas turbine engine. FIG. 15 illustrates a schematic of an exemplary canned combustor 100 for a gas turbine engine. In FIG. 15 the final stages 101 of an air compressor are shown. The combustor 100 comprises a combustor liner 103 and a transition piece 105, which extends from the combustor liner 103 to inlet nozzles of the first stage of the turbine section, not shown. The combustor liner 103 and the transition piece 105 can be produced by additive manufacturing using the above described methods.

FIG. 16 illustrates a sectional view of an annular combustion chamber 110 for a gas turbine engine. Only one half of the section is shown, above the turbine axis B-B. The annular combustion chamber can include an outer liner portion 111.1 and an inner liner portion 111.2 coaxially arranged around the axis B-B of the gas turbine engine. The annular combustion chamber ends at the high pressure turbine inlet nozzles schematically shown at 113. Both liner portions 111.1 and 111.2 can be manufactured as described above.

While any laser source suitable for powder laser metal deposition can be used to perform the methods disclosed herein, laser offering a preferably constant or quasi-constant laser intensity across the laser spot are presently preferred, as they provide a more uniform melting of the powder across the laser spot and may better perform in terms of reduced thermal stresses and resulting deformations induced in the final article of manufacture.

In some embodiments, lasers having a low Beam Parameter Product (BPP) can be preferred. As known to those skilled in the art BPP is the product between the divergence angle (half angle) expressed in radian of the laser beam and the radius (expressed in mm) of the beam waist, i.e. the radius of the beam at the narrowest point thereof.

In some embodiments, lasers having a BPP ranging between about 5 mm*rad and about 40 mm*rad can be particularly advantageous in implementing the methods disclosed herein.

For additive manufacturing of thin-walled machine components, having a wall thickness of about 5 mm or below, preferably about 4 mm or below, for instance between about 1 mm and about 4 mm, a laser spot is particularly advantageous of about 400 micrometers or more, preferably ranging between about 500 micrometers and about 700 micrometers, more preferably between about 520 micrometers and about 600 micrometers. In presently preferred embodiments, the laser intensity within the laser spot is between about 200 and 240 $kW/cm^2$, preferably between about 210 and about 220 $kW/cm^2$ and is substantially constant. Generally, a substantially constant laser intensity value within the laser spot is preferred in an effort to provide a more uniform powder melting and reduce thermally induced stresses in the final component.

The term "substantially constant" as used herein referring to a parameter or quantity, can be understood as including a variation of +10% and preferably a variation of +5% around a fixed value of said parameter or quantity.

Unless differently specified, as used herein the term "about" when referred to a value of a parameter or quantity can be understood as including any value within ±5% of the stated value. Thus, for instance, a value of "about x", includes any value within the range of (x−0.05x) and (x+0.05x).

Particularly efficient additive manufacturing of hollow, thin-walled components of large transversal dimensions can be achieved using fiber lasers, i.e. lasers in which energy is delivered by pumping diodes into suitably doped optical fibers which are the active gain medium of the laser.

While the invention has been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

The invention claimed is:

1. A method of making hollow turbomachine components using additive manufacturing, the method comprising:
    producing a semi-finished component having an inner diameter by depositing material on a substrate to form portions of the semi-finished component in the following sequence:
        a first terminal portion of the semi-finished component, the first terminal portion adhering to the substrate and forming a sacrificial flange;
        an intermediate portion of the semi-finished component, the intermediate portion having a first end and a second end, the first end adjoining the first terminal portion, wherein the intermediate portion has a thickness that is less than the thickness of the sacrificial flange; and
        a second terminal portion of the semi-finished component, the second terminal portion adjoining the second end of the intermediate portion and forming a stiffening feature in which the inner diameter of semi-finished component increases from a first diameter to a second diameter; and
    removing the first terminal portion and t second terminal portion from the intermediate portion by,
        cutting the semi-finished component at the first terminal portion to separate the semi-finished component from the substrate, thus forming a first free end of the semi-finished component that includes material of the first terminal portion; and
        cutting the semi-finished component to separate the stiffening feature from the intermediate portion, thus forming a second free end of the semi-finished component; and
    machining the semi-finished component on the first free end to create a thin flange that extends in a direction that is perpendicular to the longitudinal axis of the intermediate portion.

2. The method of claim 1, further including at least one of the following steps:
    detaching the component from the substrate; and
    machining the substrate into a final feature of the turbomachine component.

3. The method of claim 1, wherein the step of producing said second terminal portion comprises the step of generating a sacrificial extension of the intermediate portion, having at least a cross section with a variable transversal dimension, preferably a conical section, with a first, smaller diameter and a second, larger diameter; and wherein the first, smaller diameter is preferably proximate the intermediate portion and said second, larger diameter is preferably facing opposite said intermediate portion.

4. The method of claim 1, wherein said at least one of said first terminal portion and second terminal portion comprises a removable feature, adapted to concentrate thermally induced deformations therein.

5. The method of claim 1, wherein at least the intermediate portion of the component has a thickness comprised between about 0.5 mm and about 5 mm and preferably between about 1 mm and about 4 mm.

6. The method of claim 1, wherein the intermediate portion has maximum transversal dimension comprised between about 400 mm and about 3000 mm, preferably between about 500 mm and about 2000 mm.

7. The method of claim 1, wherein the additive manufacturing uses powder laser metal deposition.

8. The method of claim 1, wherein the additive manufacturing uses a fiber laser as an energy source for melting a metal powder.

9. The method of claim 1, wherein the additive manufacturing uses a laser source generating a laser spot with a diameter comprised between about 400 micrometers and about 700 micrometers, preferably between about 500 micrometers and about 650 micrometers, within which the laser intensity is substantially constant; and preferably comprised between about 200 kW/cm 2 and about 240 kW/cm$^2$.

10. The method of claim 8, wherein the laser source has a BPP of between about 5 mm*rad and about 40 mm*rad.

11. A hollow, large dimension turbomachine component, manufactured using the method of claim 1.

12. A storage memory device containing a CAD model of a hollow, large dimension semi-finished turbomachine component having features that result from the method of claim 1.

* * * * *